Feb. 6, 1951              J. AICARDI              2,540,414
RADIO GUIDING SYSTEM
Filed July 1, 1947
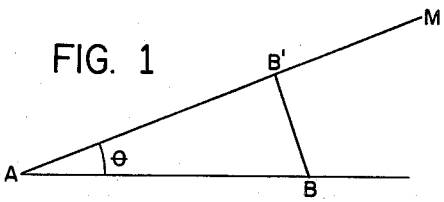
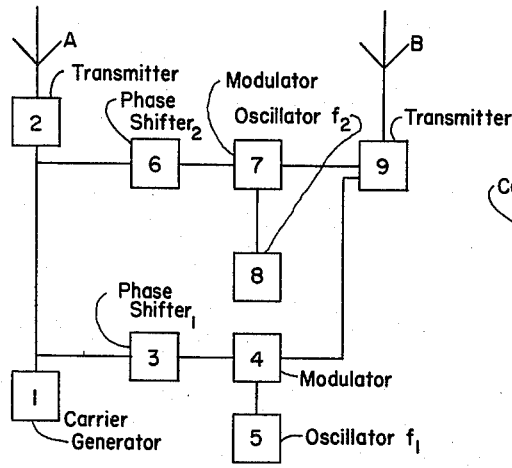
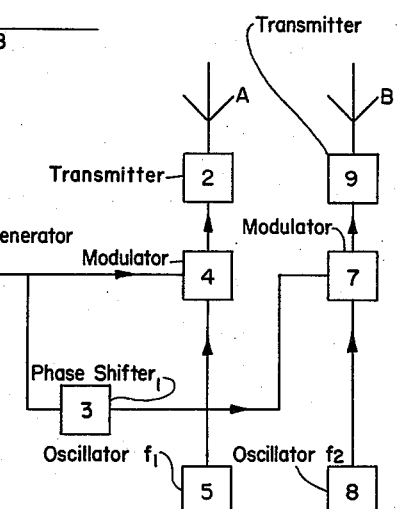
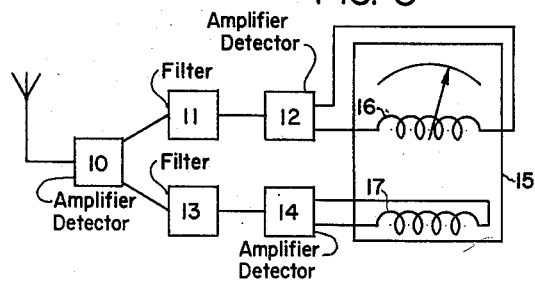
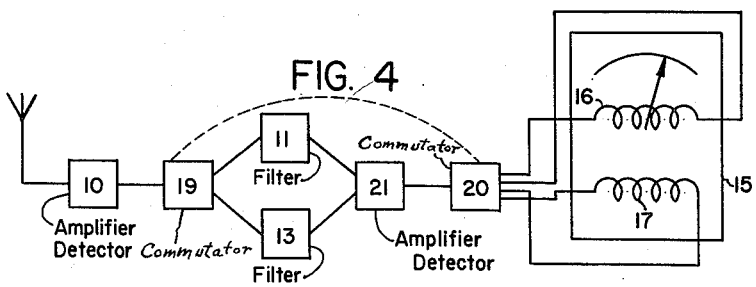
INVENTOR.
BY Joseph Aicardi

Patented Feb. 6, 1951

2,540,414

UNITED STATES PATENT OFFICE

2,540,414

RADIO-GUIDING SYSTEM

Joseph Aicardi, Versailles, France, assignor to Societe Francaise Sadir-Carpentier, Paris, France, a corporation of France Application July 1, 1947, Serial No. 758,335
In France October 15, 1943

Section 1, Public Law 690, August 8, 1946
Patent expires October 15, 1963

6 Claims. (Cl. 343—107)

It has already been proposed to indicate radio-electrically a direction by use of an interference field obtained by the combination of two component fields, emitted by radiating systems placed at a certain distance apart and taking advantage of the out-of-phase conditions of its fields at the point of reception caused by the difference in the duration of the travel of the waves emanating therefrom, these out-of-phase conditions varying with the direction in which the receiver is situated.

Such a system of indicating is for example described in French Patent No. 630,248, lodged on May 21, 1926, by "Société Anonyme Ondes Dirigées," and entitled "Location Method."

From another point of view, there are known also direction finding systems according to which one hears at the receiver a sound of a certain frequency, with a predominating intensity if the hearer is on one side of the directional axis, the sound of another frequency being heard if he is on the other side, the two sounds being heard with an equal force if he is on the axis itself.

The present invention concerns a direction finding method and apparatus producing at the point of reception sounds of frequency $f_1$ or $f_2$ according to the relative location of the receiver with respect to the directional axis, and this, by making use of interference fields as has been indicated above.

The present invention has more particularly for its object the production of interference fields adapted to the purpose indicated.

According to the invention, two fields of the same high frequency, one of which is not modulated, and the other is modulated at the same time by the audible frequencies $f_1$ and $f_2$, are transmitted simultaneously and the transmission is produced in such a manner that the respective percentages of modulation, at the point of reception, of the resultant modulated field, vary with the direction in which is found the receiver, these percentages of modulation varying preferably in opposite senses when this direction changes.

The invention thus arrives at the desired results by operating on the depths of modulation of the received field, that is to say, by the same mechanism as that which is made use of in the French Patent No. 630,248 aforesaid, although the expression percentage of modulation is not expressly mentioned therein.

The invention will be explained more in detail by referring to the accompanying drawings illustrating by way of example and not in a binding sense a preferred method of construction. In said drawings:

Fig. 1 shows the arrangement of transmitting aerials.

Fig. 2 shows the transmitter feeding these aerials.

Fig. 3 is a schematic diagram of a receiver adapted to be used in this invention.

Fig. 4 is a schematic diagram of a modified receiver adapted to be used with this invention.

Fig. 5 is a schematic diagram of a modified form of transmitter adapted to be used with this invention.

According to a first embodiment of the invention, two omnidirectional aerials A and B (Fig. 1) transmit respectively, (1) a non-modulated field $H_a$ according to the equation, $$H_a = a \sin \omega t$$

$\omega$ being the value of the high frequency transmitted, $t$—and (2) a field $H_b$ of the same high frequency as A, simultaneously modulated by the frequencies $f_1$ and $f_2$ preferably with the suppression of the carrier waves, and according to the equation:

$$H_b = b\ [\sin (\omega t - \varphi_1) \sin 2\pi f_1 t + \sin(\omega t - \varphi_2) \sin 2\pi f_2 t]$$

The aerials A and B are at a distance $d$ from one another, this distance being as is generally the case small with respect to that which separates the system AB from the receiving station lying in the direction AM forming an angle $\theta$ with the direction AB.

It is thus apparent that under these conditions the field received in the direction AM will have for its value, no account being taken of a general shifting common to both waves:

$$a \sin (\omega t) + b\ [\sin(\omega t) - \varphi_1 - \delta) \sin 2\pi f_1 t + \sin (\omega t) - \varphi_2 - \delta) \sin 2\pi f_2 t] \quad (1)$$

the supplementary shifting $\delta$ between the waves transmitted from A and those coming from B being set up by the supplementary path AB' for the waves coming from A. One has thus:

$$\delta = \frac{2\pi}{\lambda} d \cos \theta$$

$\lambda$ being the common high frequency wave-length emitted from A and B.

The receiver shown in Fig. 3 comprises a single high frequency amplifier and detector 10 feeding for example two low frequency preferably resonant amplifiers 11 and 13 in parallel, tuned respectively to the frequencies $f_1$ and $f_2$, in such a manner that each allows substantially only a frequency $f_1$ or $f_2$ to pass therethrough. The currents furnished by the low frequency amplifiers 12 and 14 are fed to the two coils 16 and 17 respectively, of the indicator 15 according to already known methods of direction finding operating by means of two modulating frequencies.

It is possible obviously to replace the two low frequency amplifiers 12 and 14 by a single amplifier 21 fed alternately through two filters 11 and 13, by the use of input commutator 19 and output commutator 20, permitting to pass, respectively the frequencies $f_1$ and $f_2$ as shown in Fig. 4.

Obviously by the action of the detector and the low frequency amplifiers, there is received respectively at the output of these amplifiers: a current of a frequency $f_1$ and of an amplitude equal to the absolute value of:

$$k_1 \cos (\varphi_1 + \delta)$$

and a current of frequency $f_2$ and of an amplitude equal to the absolute value of:

$$k_1 \cos (\varphi_2 + \delta)$$

the coefficient $k_1$ being the same in these two formulæ.

This results immediately from the fact that at the input of the detector the respective percentages of modulation of the modulated currents received are respectively proportional to $$[\cos (\varphi_1 + \delta)] \text{ for } f_1 \text{ and } [\cos (\varphi_2 + \delta)] \text{ for } f_2$$

as is easily ascertained by making the vectorial additions interpreting Formula 1 with the assumption that $b$ is appreciably smaller than $a$, a condition easy to secure.

It remains to note that the assumption $b$ small with respect to $a$ has been given out only so as to simplify the formulæ and to make the explanations easier; it is not necessary for the carrying out of the invention and for obtaining the advantages deriving therefrom.

It will thus be seen that the direction finding axis defined by the equality of the currents issuing from the two amplifiers is determined by the relation $$\cos (\varphi_1 + \delta) = \pm \cos (\varphi_2 + \delta)$$

which leads to $$\varphi_1 + \delta + m\pi = -(\varphi_2 + \delta)$$

as the equation with the sign $+$ gives of course no interesting result, the last equation may be written (2) $\quad 2\delta = -(\varphi_1 + \varphi_2 + m\pi)$ $m$ being the whole number, $\delta$ thus determined gives $\theta$ by the relation established above.

$$\delta = \frac{2\pi}{\lambda} d \cos \theta$$

It is thus seen that $\lambda$ and $d$ being known once and for all as also the ratio $$\frac{b}{a}$$

the direction of one of the marked directions is determined by the value of the sum $\varphi_1 + \varphi_2$ and depends only on the latter so that this direction may be adjusted by a modification of the value of this sum, which constitutes an important advantage of the method of guiding according to the invention.

It is known, on the other hand, how to maintain, in a precise manner (in addition to the length of the transmitted wave), a constant phase shift of the currents of high frequency and also constant amplitudes of such currents, which ensures a permanent definition of the directional axis in space.

So long as $$\frac{d}{\lambda}$$

is made sufficiently small, it will easily be seen that Formula 2 not only gives a single suitable value for $\delta$, but also a single direction $\theta$ for the marked axis.

It will be noted also that it is not necessary for the aerial B to transmit only the side bands of the modulated transmissions; it may transmit also the corresponding carrier wave so long as its amplitude is not greater than that of the side bands.

It should also be noted that it is not essential for the aerials used to be omnidirectional, that is to say have a circular radiation diagram, and the fact of using directional aerials can simply modify the law of variation of the out-of-phase conditions as a function of the direction. This permits in particular using these aerials having a maximum transmission in the direction of the marked axis (useful direction).

The setting up of the fields $H_a$ and $H_b$ is, as can be seen, very simple (Fig. 2). The high frequency oscillation generator 1 is connected directly to the transmitter 2 which feeds aerial A. The generator 1 is connected to the phase shifting device 3, which introduces a delay $\varphi_1$ into the oscillation fed therethrough to the modulator 4 which also receives the frequency $f_1$ from the oscillator 5. The high frequency oscillation generator 1 also feeds oscillations through the phase shifting device 6, that introduces the delay $\varphi_2$ therein, to the modulator 7 which is also connected to receive the frequency $f_2$ from the oscillator 8. The modulators 4 and 7 operate in parallel on a transmitter 9 feeding the aerial B. It is clear that this arrangement can be submitted to many modifications.

The above construction leads to utilising at the point of the reception, the relative out-of-phase conditions between two similar fields $H_a$ and $H_b$, each having an amplitude independent of the direction of transmission.

This last condition is not however essential.

It is possible to design other constructions, as shown in Fig. 5, producing the same result and which in consequence come within the spirit of the present invention, for example the field may assume the shape corresponding to the formula:

$$H_a = a \sin \omega t \, (1 + k \cos 2\pi f_1 t)$$

with $$H_b = b \sin (\omega t + \varphi) \cos 2\pi f_2 t$$

It is clear that in this modification the percentage modulation for the frequency $f_1$ is constant in all directions and equal to $k$, while that relative to $f_2$ is a function of the direction $\theta$ which allows producing again a marked axis the direction of which is a function of $\varphi$ and of the ratio $$\frac{b}{a}$$

These two fields are obviously very easy to transmit, their production being common knowledge in the art. This modification is however in principle less advantageous than the first embodiment disclosed since the percentage of modulation of only one of the frequencies $f_1$, $f_2$ varies as a function of the direction, while in the first embodiment the percentage modulation of both these frequencies vary in opposite senses, obviously giving greater accuracy in the definition of the directional axis.

If at the receiving station there are employed acoustical methods for comparing currents at frequencies $f_1$ and $f_2$, these frequencies should clearly be audible, but if one utilises other methods (for example optical or electrical) it is clear that it need not necessarily be so, as in such cases these frequencies may be for example above the audible range.

What I claim is:

1. Radio position determining apparatus comprising high frequency transmitting apparatus, a pair of antennas connected to said transmitting apparatus, said antennas being positioned in relatively close proximity to each other, low frequency oscillation generating apparatus for producing a pair of low frequency oscillations, modulator apparatus for selectively modulating said high frequency transmitting apparatus in accordance with said low frequency oscillations, and phase adjusting apparatus connected to said high frequency transmitting apparatus for adjusting the phase of the waves radiated by said antennas so that a field is radiated having an axis along which the resultant field is modulated by the two low frequency oscillations equally and on the opposite sides of which axis the resultant field is modulated to different degrees by each of said low frequencies.

2. Radio position determining apparatus comprising a first transmitter, a first antenna connected to said first transmitter, a second transmitter, a second antenna connected to said second transmitter and positioned in relatively close proximity to said first antenna, a high frequency oscillation generator connected to said first and said second transmitters, oscillator means for producing a pair of modulation frequencies, a pair of modulators connected between said high frequency oscillation generator and said second transmitter for modulating said second transmitter in accordance with said pair of modulation frequencies, and apparatus for adjusting the phase of the waves radiated by said first and said second antennas so that a field is radiated having an axis along which the resultant field is modulated by the two modulation frequencies equally, the percentage modulation of said resultant field by one of said modulation frequencies increasing and the percentage modulation by the other of said modulation frequencies decreasing on opposite sides of said axis.

3. Apparatus as set forth in claim 1 further comprising a receiving apparatus carried by a mobile craft remote from said high frequency transmitting apparatus and having an amplifier and detector, a pair of filters adjusted to select the pair of low frequency oscillations with which the aforesaid resultant field is modulated and means connected to the output of said filters for indicating the amplitudes of said low frequency oscillations whereby the operator of said mobile craft may determine the side of the aforesaid axis the craft is located.

4. Radio position determining apparatus as set forth in claim 2 further comprising a radio receiving apparatus carried by a mobile craft remote from said transmitters and responsive to the signal transmitted thereby, said receiving apparatus comprising an amplifier, a detector, a pair of filters tuned to select said modulation frequencies and apparatus responsive to the two modulation frequencies to indicate the amplitudes thereof whereby the operator of the mobile craft may determine the side of the aforesaid axis the craft is located.

5. Radio apparatus for direction finding comprising a first transmitter, a first antenna connected to said first transmitter, a second transmitter, a second antenna connected to said second transmitter and disposed relatively near said first antenna; a high frequency oscillation generator connected to said first and to said second transmitters, oscillators for supplying a pair of modulation frequencies, a pair of modulators disposed between said high frequency oscillation generator and said second transmitter for modulating said second transmitter with said pair of modulation frequencies; a first phase shifter connected between said high frequency oscillation generator and the first of said pair of modulators, and a second phase shifter connected between said high frequency oscillation generator and the second of said pair of modulators, so that a field is radiated having an axis along which the resulting field is modulated by the two modulation frequencies, the amount of modulation of said field resulting from one of said frequencies increasing and the amount of modulation from the other of said frequencies decreasing on opposite sides of said axis.

6. Radio apparatus for direction finding comprising a first transmitter, a first antenna connected to said first transmitter, a second transmitter, a second antenna connected to said second transmitter and disposed relatively near said first antenna; a high frequency oscillation generator connected to said first and to said second transmitter; oscillators for supplying a pair of modulation frequencies, a pair of modulators disposed between said high frequency oscillation generator and said second transmitter for modulating said second transmitter with said pair of modulation frequencies; means for suppressing the carrier of said second transmitter, a first phase shifter connected between said high frequency oscillation generator and the first of said pair of modulators, and a second phase shifter connected between said high frequency oscillation generator and the second of said pair of modulators, so that a field is radiated having an axis along which the resulting field is modulated by the two modulation frequencies, the amount of modulation of said field resulting from one of said frequencies increasing and the amount of modulation from the other of said frequencies decreasing on opposite side of said axis.

JOSEPH AICARDI.

REFERENCES CITED

The following references are of record in the file of this patent:

UNITED STATES PATENTS

| Number | Name | Date |
|---|---|---|
| 1,919,556 | Jacquemin | July 25, 1933 |
| 2,107,155 | Kleinkauf et al. | Feb. 1, 1938 |
| 2,279,031 | Cocherell et al. | Apr. 7, 1942 |
| 2,367,372 | Purington | Jan. 16, 1945 |
| 2,414,431 | Alford et al. | Jan. 21, 1947 |
| 2,417,807 | Brunner | Mar. 25, 1947 |